April 10, 1962   B. J. DONOVAN   3,028,931
CHECKOUT STAND
Filed Feb. 6, 1959   3 Sheets-Sheet 2
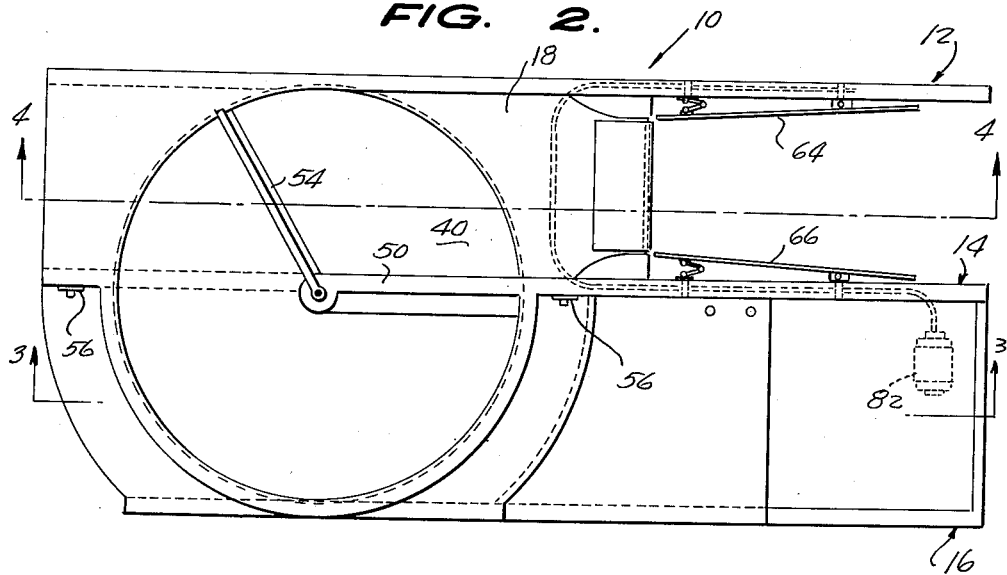
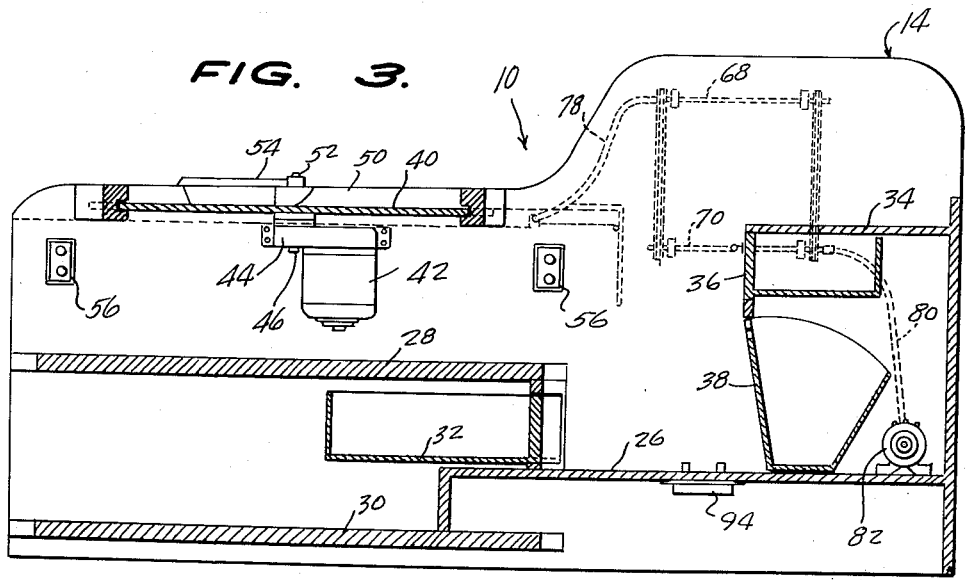
INVENTOR.
BRENDAN J. DONOVAN,
BY
McMorrow, Berman + Davidson
ATTORNEYS.

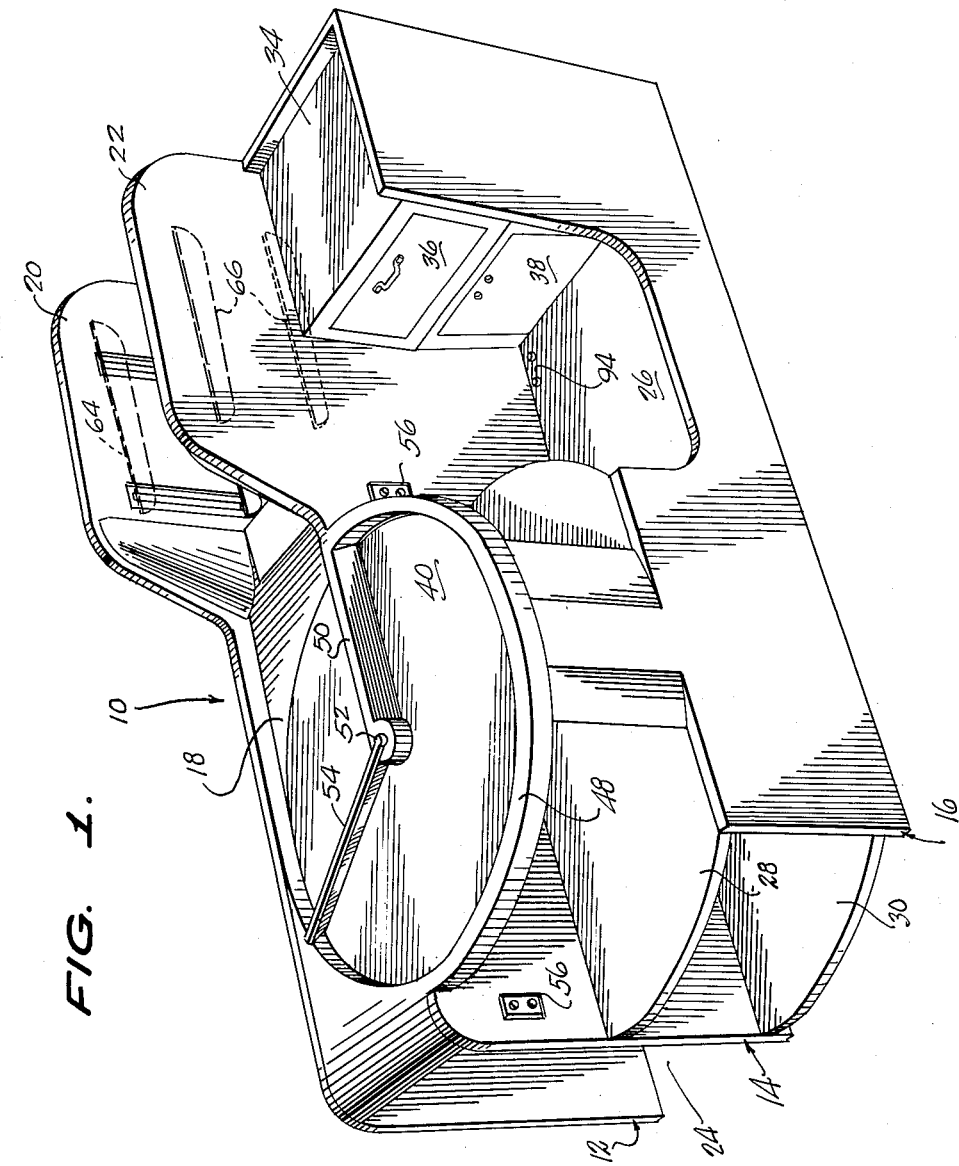

April 10, 1962
B. J. DONOVAN
3,028,931
CHECKOUT STAND
Filed Feb. 6, 1959
3 Sheets-Sheet 3
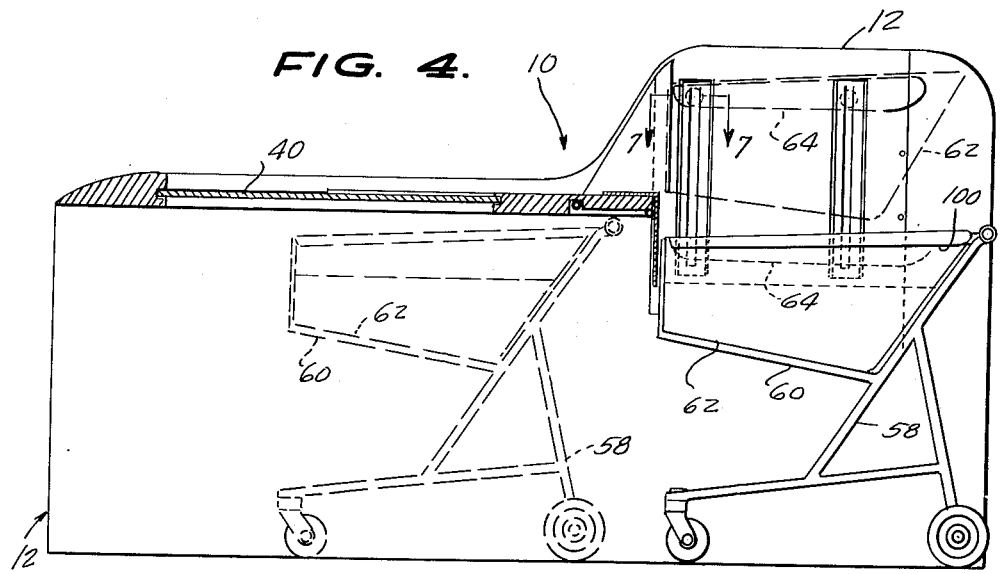
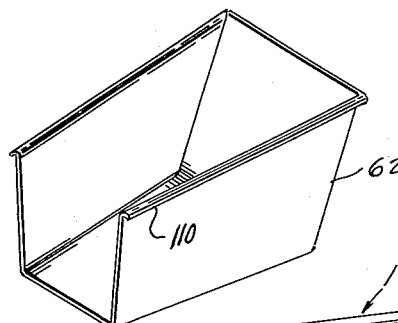
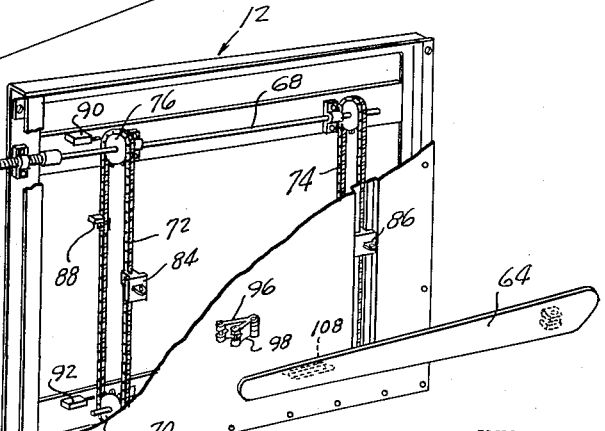
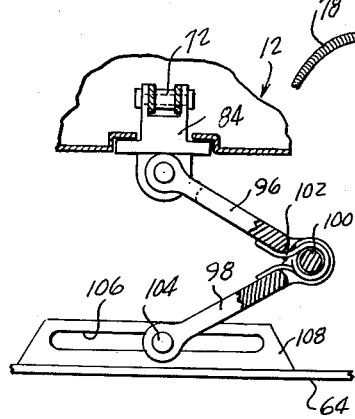
INVENTOR.
BRENDAN J. DONOVAN,
BY
McMorrow, Berman & Davidson
ATTORNEYS.

United States Patent Office 3,028,931
Patented Apr. 10, 1962

3,028,931
CHECKOUT STAND
Brendan J. Donovan, 152 Clark Road, Brookline, Mass.
Filed Feb. 6, 1959, Ser. No. 791,609
2 Claims. (Cl. 186—1)

The present invention relates to a checkout stand of the type employed in a self-service store.

Presently in use in self-service stores are checkout stands to which customers bring hand carts for unloading of the hand carts of the articles selected for purchase, compilation by the store checker of the total purchase price of such articles, and bagging of the articles for transportation out of the store. Generally, the customers are required to unload the hand cart and to place the selected cart articles on the table of the checkout stand. The unloading of the hand cart by the customer is usually at a slower rate than when the more experienced checker unloads the hand cart. Also, when the checker unloads the hand cart, he selects articles from the same department of the store and groups the articles from each department together in order to expedite the compilation of the total bill. Frequently, some articles have a sales tax which is computed separately. Those articles having a sales tax are grouped separately as well as the articles being grouped according to the departments of the store. Most checkout stands are constructed in such sizes as to prohibit the lifting of the selected articles from the hand cart by the checker as the receptacles on the hand cart are usually at a relatively low level for the convenience of the customer and when the hand cart is in position adjacent the checkout table, the checker must reach across the table and into the hand cart receptacle for unloading of the latter. This results in excessive fatigue to the checker and results in longer rest periods for the checker with consequent lowering of production of the store employees. Additionally, when the articles selected have been paid for, the customer generally selects another hand cart for transportation of the purchased articles out of the store and to a waiting automobile. The selection of another hand cart entails a further waste of time in the checking out of the articles purchased and if a hand cart is not immediately available, frequently the customer requires the services of the checker or another individual to carry bagged articles out of the store for him.

An object of the present invention is to provide a checkout stand for a self-service store which enables the operator thereof or checker to unload the receptacle of the customer's hand cart with ease and facility.

Another object of the present invention is to provide a means by which, in a checkout stand of a self-service store, the customer's hand cart is automatically shifted out of the way of succeeding customers and automatically made available for use as a means of transporting the bagged purchased articles to the waiting automobile of the customer.

A further object of the present invention is to provide a checkout stand for a self-service store which may be constructed as a unitary structure, completely portable and one which may be installed with ease and facility within a self-service store.

A still further object of the present invention is to provide a checkout stand for a self-service store which is sturdy in construction, one simple in structure, one economically feasible, and one which is highly effective in action.

These and other objects and advantages of the present invention will be fully apparent from the following description when taken in conjunction with the annexed drawings, in which:

FIGURE 1 is an isometric view of the checkout stand according to the present invention;
FIGURE 2 is a top plan view;
FIGURE 3 is a view taken on the line 3—3 of FIGURE 2;
FIGURE 4 is a view taken on the line 4—4 of FIGURE 2 with a hand cart and associated receptacle shown in position for elevating of the receptacle, the dotted line shown indicating the elevated position of the hand cart receptacle and also the shifted position of the hand cart with the empty receptacle thereon;
FIGURE 5 is an isometric view of the receptacle employed with the hand cart, as seen from the top and side;
FIGURE 6 is an exploded isometric view of a portion of one of the walls of the checkout stand; and
FIGURE 7 is a view on an enlarged scale, taken on the line 7—7 of FIGURE 4.

Referring in greater detail to the drawings in which like numerals indicate like parts throughout the several views, the reference numeral 10 designates generally the checkout stand of the present invention and which comprises three elongated walls 12, 14, and 16. The walls 12, 14, and 16, are arranged in lateral spaced relation and have their lower ends adapted for support upon a floor surface, the latter not being shown. The checkout table 18 extends inwardly from one end of the walls 12 and 14 and terminates at a point spaced from the other ends of the walls 12 and 14. The table 18 is supported on the walls 12 and 14 and the latter have portions 20 and 22 extending above the level of the table 18, as shown most clearly in FIGURE 1. The space defined by the table 18 and the adjacent portion of the walls 12 and 14 defines a tunnel 24, as shown in FIGURE 1.

The space between the walls 14 and 16 is provided with a raised floor 26 providing a platform for the checker or operator of the checkout stand. Shelves 28 and 30, supported on the walls 14 and 16, provide compartments for the storage of bagging materials. A portion of the floor 26 extends over the shelf 30 and provides a support for a drawer 32, the interior of the drawer 32 being accessible to the checker when standing upon the floor 26.

Adjacent the ends of the walls 14 and 16 remote from the shelves 28 and 30 is a shelf 34 for the support thereon of a cash register or other accounting machine for the use of the checker when standing upon the floor 26. Below the shelf 34 are a sliding drawer 36, mounted immediately below the shelf 34, and a tilting bin-type compartment 38 hingedly fixed to the floor 26. The interiors of the drawers 36 and 38 are accessible to the operator or checker when standing upon the floor 26.

The stand table 18 is cut away in the portion of the table 18 centrally of the tunnel 24 and over the shelves 28 and 30 to provide space for a rotating counter 40. A motor 42 is mounted upon the wall 14 on the side of the latter adjacent the wall 16 with its drive shaft (not shown) vertically disposed and mounted within a gear reduction unit 44. The output shaft 46 of the gear reduction unit 44 has its upper end drivingly connected to the counter 40 for rotation of the latter when the motor 42 is energized. Only the lower end portion of the shaft 46 is shown.

The cutout portion of the table 18 provides a rim, as at 48 in FIGURE 1, extending around the portion of the perimeter of the counter 40 from the adjacent parts of the wall 14 to the wall 16. A divider strip 50 extends longitudinally of the wall 14 and in alignment therewith from one end of the rim 48 to the center of the counter 40. The free end of the divider strip 50 is unsupported but carries a pivot pin 52 which provides a pivotal connection for a divider arm 54 loosely resting upon the counter 40 and swingable about the divider strip 50 from one side thereof to the other side. A pair of switches 56 are in circuit with a source of electrical energy and with the motor 42 and are accessible either to the checker when standing on the floor 26 or to the individual charged with bagging of the merchandise when placed on the counter 40 when standing on the floor surface adjacent the free ends of the shelves 28 and 30.

In FIGURE 4, a hand cart 58 is shown in full lines in a position in which it is in the space between the walls 12 and 14 exteriorly of the table 18 and defined by the portions of the walls 12 and 14 between the terminating point of the table 18 and the ends of the walls 12 and 14 remote from the table 18. The hand cart 58 is of a size and heighth and width to be freely rollable through the tunnel 24 responsive to the application of a manually applied force thereto. The hand cart 58 carries a shallow basket 60 having therein a receptacle 62 open at the top and open at one end. The receptacle is shown most clearly in FIGURE 5.

Lifting means is provided movably carried by the walls 12 and 14 and is engageable with the receptacle 62 when the hand cart 58 has been moved into the space between the walls 12 and 14 for elevating the receptacle 62 from the cart 58 to a position in which the bottom of the receptacle 62 is substantially level with the table 18 for manual removal of the contents of the receptacle 62 and shifting of the contents to the discharge portion of the table 18 adjacent the free ends of the shelves 28 and 30. Specifically, this lifting means embodies a pair of saddle members 64 and 66 positioned between the walls 12 and 14 and normally below and adjacent the table 18 and connected to the walls 12 and 14 for upward movement from the normal position to a position spaced above the table 18.

Each of the saddle members 64 and 66 is arranged so as to extend transversely along and adjacent one of the walls 12 or 14 and has one end pivotally connected to the wall 12 or 14 with means operatively connected to the other end of each saddle member 64 and 66 for urging such other ends of the members 64 and 66 toward each other. There is within each of the walls 12 and 14, which are hollow, an elevating mechanism, shown most clearly in FIGURE 6 with reference to the wall 12. This mechanism consists in a pair of horizontally disposed shafts 68 and 70 arranged in superimposed spaced relation. The shafts 68 and 70 are mounted in the wall 12 for rotation and are connected together by chains 72 and 74 which travel over appropriately arranged sprocket wheels 76 mounted on the shafts 68 and 70. The one shaft 68 of the elevating mechanism within the wall 12 is connected by a flexible drive shaft 78 to the shaft 68 of the mechanism mounted within the wall 14, as shown in FIGURE 2 and FIGURE 3. The shaft 70 of the mechanism within the wall 14 is connected by another flexible drive shaft 80 (FIGURE 3) to a motor 82 mounted upon the portion of the floor 26 inwardly of the compartment drawer 38.

The saddle members 64 and 66 are carried on brackets 84 and 86 mounted upon the chains 72 and 74, respectively, of each of the elevating mechanisms within the walls 12 and 14. As such mechanisms are identical, although reversed, only the mechanism within the wall 12 is illustrated and described. Portions of the brackets 84 and 86 project outwardly of the face of the walls 12 and 14 and are slidable in recessed portions of such wall surfaces, the recessed portions forming trackways for the brackets 84 and 86. The chain 72 of the assembly within the wall 12 carries a stop 88 alternatingly engageable with stop switches 90 and 92 carried by the wall 12. A foot-operated switch 94 (FIGURE 1) is connected in circuit with the switches 90 and 92 and with the motor 82, the switch 94 being positioned on the floor 26 and a place accessible to the foot of the operator or checker when standing on the floor 26.

Spring means is provided operatively connecting one end of each of the saddle members 64 and 66 to the adjacent bracket 84 for urging the one end of the saddle members 64 and 66 to a position converging or toward each other so as to frictionally embrace the sides of the receptacle 62 when the cart 58 is moved to the position between the walls 12 and 14, as shown in FIGURE 4. This means is shown in detail in FIGURE 7 and consists in a pair of arms 96 and 98 having their one ends integrally connected together by a pin 100 with a spring 102 circumposed partially around the pin 100 and having its ends interlocked with the adjacent parts of the arms 96 and 98. The free end of the arm 96 is pivotally connected to the adjacent bracket 84, and the free end of the other arm 98 is connected by a pin 104 to a slot 106 provided in a plate 108 carried on the face of the saddle member 64 adjacent the wall 12.

The sides of the receptacle 62 slope outwardly from the bottom to the top and also from the front to the rear and the basket 60 is conformably shaped to loosely receive the receptacle 62. The upper ends of the basket 60 are spaced below the rolled over rims 110 on the sides of the receptacle 62, the rims 110 receiving the upper edges of the saddle members 64 and 66 when the cart 58 has been pushed to the position between the walls 12 and 14, as shown in full lines in FIGURE 4.

In use, the checkout stand of the present invention is easily installed in a self-service store or other establishment and proper connections to the motors 42 and 82 be made to a source of current within the store. The customer arriving with a cart 58 having thereon a loaded receptacle 62 pushes the cart 58 between the walls 12 and 14 and engages the saddle members 64 and 66 with the sides of the receptacle 62 above the upper end of the basket 60. The operator or checker depresses one or other of the buttons of the switch 94 to energize the motor 82 and to effect the elevating movement of the saddle members 64 and 66 upwardly from the position in which the upper end of the receptacle 62 is below the table 18 to a position in which the bottom of the receptacle is at substantially the same level as the table 18. The operator then removes from the receptacle 62 the articles selected and places them on the counter 40, using the divider arm 54 to separate the articles on the counter 40 from the articles of a previous purchase. The arm 54 will be moved in the counterclockwise direction, FIGURE 2, by the articles placed on the counter 40 and the articles will be moved around the counter 40 to a position accessible to the individual charged with bagging the articles.

Meanwhile, the checker energizes the motor 82 in the opposite direction and lowers the receptacle 62 to its position on the cart 58 within the basket 60. Another customer arriving with a cart 58 pushes the first-mentioned cart under the table 18 through the tunnels defined by the walls 12 and 14 and the table 18, as shown in dotted lines in FIGURE 4. This will result in the positioning of a cart 58 with an empty receptacle 62 adjacent the discharge end of the table 18 and make such cart 58 available for bagged articles for transportation to the automobile of the purchaser.

What is claimed is:

1. In a checkout stand, a pair of elongated walls arranged in lateral spaced relation and having their lower ends adapted to be supported upon a floor surface, a checkout table extending inwardly from one end of said walls and terminating at a point spaced from the other end of said walls and supported on said walls, the space defined by said table and the adjacent portions of said walls defining a tunnel, a hand cart adapted for rolling movement on said floor surface and of a heighth and width to freely pass through said tunnel, an open top receptacle having one end open disposed on said cart, said cart being movable into the space defined by the portion of said walls between the terminating point of said table and the other ends of said walls through the other ends of said walls, the open top of said receptacle being adjacent to and spaced below said table when said cart has been moved into the space between said walls, and lifting means embodying a pair of saddle members positioned between said walls, each of said members being arranged so as to extend transversely along and adjacent a wall and having one end pivotally mounted on said wall, means operatively connected to the other ends of said members for urging said other ends toward each other, said saddle members being normally below and adjacent said table and mounted on said walls for upward movement from the normal position to a position spaced above said table, said saddle members being engageable with the sides of said receptacle when said cart has been moved into the space between said walls to elevate said receptacle to the position spaced above said table when said saddle members execute their upward movement for manual removal of the contents of said receptacle and shifting of the contents to the discharge end of said table and to lower the empty receptacle on to said cart, said cart having the emptied receptacle thereon being insertable into said tunnel for passage therethrough by application of a manually applied force thereto.

2. In a check-out stand, a pair of elongated vertical parallel walls adapted to be supported on a floor surface, a table mounted on and extending inwardly from one end of the walls and terminating short of the other ends of the walls, said table and walls defining a tunnel, a cart adapted to be moved about the floor surface, a receptacle open at the top and at one end and carried by the cart, said cart and receptacle being sized to pass freely between said walls and through the tunnel when the receptacle is carried by the cart, a pair of substantially horizontal saddle members mounted on said walls adjacent said other ends and outside said tunnel, means biasing the ends of said saddle members nearer the table toward one another, supports carrying said members on said walls at a height adapted to engage the sides of said receptacle when said cart is positioned between said walls outside said tunnel, and actuating means secured to said supports for simultaneously raising said saddle members to position said receptacle with its bottom at the height of the table and for simultaneously lowering said saddle members to replace the receptacle on the cart.

References Cited in the file of this patent
UNITED STATES PATENTS

| | | |
|---|---|---|
| 898,250 | Mitchell | Sept. 8, 1908 |
| 1,689,760 | Young et al. | Oct. 30, 1928 |
| 2,596,686 | Hess | May 13, 1952 |
| 2,604,190 | Meyer | July 22, 1952 |
| 2,631,689 | Rubaloff | Mar. 17, 1953 |
| 2,695,209 | De Witt et al. | Nov. 23, 1954 |
| 2,943,707 | Ramlose | July 5, 1960 |

OTHER REFERENCES

Clauben et al.: N 8065 (K1–81e) Jan. 5, 1956 (German application) (printed).